US011928377B2

(12) United States Patent
Ohtake

(10) Patent No.: US 11,928,377 B2
(45) Date of Patent: Mar. 12, 2024

(54) INFORMATION PROCESSING SYSTEM, INFORMATION PROCESSING METHOD AND NON-TRANSITORY RECORDING MEDIUM FOR STORING A DETERMINATION RESULT INDICATING WHETHER OUTPUT OF INFORMATION IS SUBJECT TO PROCESSING IN ASSOCIATION WITH INFORMATION RELATED TO THE OUTPUT

(71) Applicant: Yuuya Ohtake, Kanagawa (JP)

(72) Inventor: Yuuya Ohtake, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/045,515

(22) Filed: Oct. 11, 2022

(65) Prior Publication Data
US 2023/0143735 A1    May 11, 2023

(30) Foreign Application Priority Data

Nov. 9, 2021  (JP) .................................. 2021-182474

(51) Int. Cl.
*G06F 3/12*    (2006.01)
(52) U.S. Cl.
CPC .......... *G06F 3/1285* (2013.01); *G06F 3/1203* (2013.01); *G06F 3/1224* (2013.01)
(58) Field of Classification Search
CPC ..... G06F 3/1285; G06F 3/1203; G06F 3/1224

USPC ........................................................ 358/1.15
See application file for complete search history.

(56) References Cited

U.S. PATENT DOCUMENTS

| 2002/0015179 | A1* | 2/2002 | Igarashi ................. G06Q 30/06 358/1.15 |
| 2004/0067084 | A1* | 4/2004 | Zerza ......................... B41J 3/44 400/76 |
| 2005/0117719 | A1* | 6/2005 | Hyotani ................. G06Q 10/10 379/90.01 |
| 2005/0264844 | A1* | 12/2005 | Fujitani .............. H04N 1/00143 358/1.15 |
| 2014/0067456 | A1 | 3/2014 | Kashida |
| 2020/0278816 | A1* | 9/2020 | Aoki ...................... G06F 3/1204 |

FOREIGN PATENT DOCUMENTS

| JP | 2000-181967 | 6/2000 |
| JP | 2000-214186 | 8/2000 |
| JP | 2014-049059 | 3/2014 |

* cited by examiner

*Primary Examiner* — Allen H Nguyen
(74) *Attorney, Agent, or Firm* — IPUSA, PLLC

(57) ABSTRACT

An information processing system, an information processing method, and a non-transitory recording medium. The information processing system receives from a communication terminal that requests a device to output information related to the output by the device, and stores in one or more memories, a determination result indicating whether the output of the information by the device is subject to processing in association with the information related to the output by the device.

9 Claims, 21 Drawing Sheets

FIG. 6

| DATE | ENTRY TIME | EXIT TIME |
|---|---|---|
| JANUARY 10, 2021 | 09:00 | 17:30 |
| JANUARY 11, 2021 | – | – |
| JANUARY 12, 2021 | – | – |
| JANUARY 13, 2021 | – | – |
| JANUARY 14, 2021 | – | – |
| JANUARY 15, 2021 | – | – |
| JANUARY 16, 2021 | – | – |

FIG. 7

| DATE | WORK START TIME | WORK END TIME |
|---|---|---|
| JANUARY 10, 2021 | - | - |
| JANUARY 11, 2021 | 09:00 | 17:30 |
| JANUARY 12, 2021 | 09:00 | 17:30 |
| JANUARY 13, 2021 | 09:00 | 17:30 |
| JANUARY 14, 2021 | 09:00 | 17:30 |
| JANUARY 15, 2021 | 09:00 | 17:30 |
| JANUARY 16, 2021 | - | - |

FIG. 8

| DOWNLOAD DATE | TIME | DOCUMENT NAME |
|---|---|---|
| JANUARY 11 2021 | 20:10:00 | CCC.DOCX |
| JANUARY 15, 2021 | 22:10:00 | GGG.PPTX |

FIG. 9

| ID | PRINT DATE | PRINT TIME | NO. OF PRINTS (BLACK AND WHITE) | NO. OF PRINTS (FULL COLOR) | DOCUMENT NAME | DETERMINATION RESULT FOR SETTLEMENT |
|---|---|---|---|---|---|---|
| JOB1 | JANUARY 10, 2021 | 13:50:00 | 20 | 0 | AAA.PDF | |
| JOB2 | JANUARY 11, 2021 | 09:20:00 | 10 | 0 | BBB.DOCX | |
| JOB3 | JANUARY 11, 2021 | 20:10:00 | 0 | 20 | CCC.DOCX | |
| JOB4 | JANUARY 12, 2021 | 12:20:00 | 0 | 30 | DDD.PPTX | |
| JOB5 | JANUARY 13, 2021 | 20:30:00 | 200 | 0 | EEE.PDF | |
| JOB6 | JANUARY 15, 2021 | 10:50:00 | 0 | 20 | FFF.PDF | |
| JOB7 | JANUARY 15, 2021 | 22:10:00 | 100 | 0 | GGG.PPTX | |

FIG. 10

| CONDITION NUMBER | DETERMINATION CONDITION |
|---|---|
| 01 | PRINT TIME INCLUDED IN BETWEEN ENTRY TIME AND EXIT TIME |
| 02 | DOCUMENT NAME SAME AS FILE NAME DOWNLOADED FROM EXTERNAL STORAGE SERVER |
| 03 | PRINT TIME IS WITHIN WORKING TIME |

FIG. 15A

| DATE | ENTRY TIME | EXIT TIME |
|---|---|---|
| JANUARY 10, 2021 | 09:00 | 17:30 |
| JANUARY 11, 2021 | – | – |
| JANUARY 12, 2021 | – | – |
| JANUARY 13, 2021 | – | – |
| JANUARY 14, 2021 | – | – |
| JANUARY 15, 2021 | – | – |
| JANUARY 16, 2021 | – | – |

FIG. 15B

| ID | PRINT DATE | PRINT TIME | NO. OF PRINTS (BLACK AND WHITE) | NO. OF PRINTS (FULL COLOR) | DOCUMENT NAME | DETERMINATION RESULT FOR SETTLEMENT |
|---|---|---|---|---|---|---|
| JOB1 | JANUARY 10, 2021 | 13:50:00 | 20 | 0 | AAA.PDF | NO |
| JOB2 | JANUARY 11, 2021 | 09:20:00 | 10 | 0 | BBB.DOCX | |
| JOB3 | JANUARY 11, 2021 | 20:10:00 | 0 | 20 | CCC.DOCX | |
| JOB4 | JANUARY 12, 2021 | 12:20:00 | 0 | 30 | DDD.PPTX | |
| JOB5 | JANUARY 13, 2021 | 20:30:00 | 200 | 0 | EEE.PDF | |
| JOB6 | JANUARY 15, 2021 | 10:50:00 | 0 | 20 | FFF.PDF | |
| JOB7 | JANUARY 15, 2021 | 22:10:00 | 100 | 0 | GGG.PPTX | |

FIG. 16A

| DOWNLOAD DATE | TIME | DOCUMENT NAME |
|---|---|---|
| JANUARY 11, 2021 | 20:10:00 | CCC.DOCX |
| JANUARY 15, 2021 | 22:10:00 | GGG.PPTX |

FIG. 16B

| ID | PRINT DATE | PRINT TIME | NO. OF PRINTS (BLACK AND WHITE) | NO. OF PRINTS (FULL COLOR) | DOCUMENT NAME | DETERMINATION RESULT FOR SETTLEMENT |
|---|---|---|---|---|---|---|
| JOB1 | JANUARY 10, 2021 | 13:50:00 | 20 | 0 | AAA.PDF | NO |
| JOB2 | JANUARY 11, 2021 | 09:20:00 | 10 | 0 | BBB.DOCX | |
| JOB3 | JANUARY 11, 2021 | 20:10:00 | 0 | 20 | CCC.DOCX | YES |
| JOB4 | JANUARY 12, 2021 | 12:20:00 | 0 | 30 | DDD.PPTX | |
| JOB5 | JANUARY 13, 2021 | 20:30:00 | 200 | 0 | EEE.PDF | |
| JOB6 | JANUARY 15, 2021 | 10:50:00 | 0 | 20 | FFF.PDF | |
| JOB7 | JANUARY 15, 2021 | 22:10:00 | 100 | 0 | GGG.PPTX | YES |

FIG. 17A

| DATE | WORK START TIME | WORK END TIME |
|---|---|---|
| JANUARY 10, 2021 | – | – |
| JANUARY 11, 2021 | 09:00 | 17:30 |
| JANUARY 12, 2021 | 09:00 | 17:30 |
| JANUARY 13, 2021 | 09:00 | 17:30 |
| JANUARY 14, 2021 | 09:00 | 17:30 |
| JANUARY 15, 2021 | 09:00 | 17:30 |
| JANUARY 16, 2021 | – | – |

FIG. 17B

| ID | PRINT DATE | PRINT TIME | NO. OF PRINTS (BLACK AND WHITE) | NO. OF PRINTS (FULL COLOR) | DOCUMENT NAME | DETERMINATION RESULT FOR SETTLEMENT |
|---|---|---|---|---|---|---|
| JOB1 | JANUARY 10, 2021 | 13:50:00 | 20 | 0 | AAA.PDF | NO |
| JOB2 | JANUARY 11, 2021 | 09:20:00 | 10 | 0 | BBB.DOCX | YES |
| JOB3 | JANUARY 11, 2021 | 20:10:00 | 0 | 20 | CCC.DOCX | YES |
| JOB4 | JANUARY 12, 2021 | 12:20:00 | 0 | 30 | DDD.PPTX | YES |
| JOB5 | JANUARY 13, 2021 | 20:30:00 | 200 | 0 | EEE.PDF | NO |
| JOB6 | JANUARY 15, 2021 | 10:50:00 | 0 | 20 | FFF.PDF | YES |
| JOB7 | JANUARY 15, 2021 | 22:10:00 | 100 | 0 | GGG.PPTX | YES |

FIG. 19

| PRINT DATE | PRINT TIME | DOCUMENT NAME | CORRECTION BUTTON |
|---|---|---|---|
| JANUARY 10, 2021 | 13:50:00 | AAA.PDF | NO ▼ |
| JANUARY 11, 2021 | 09:20:00 | BBB.DOCX | NO ▼ |
| JANUARY 11, 2021 | 20:10:00 | CCC.DOCX | YES ▼ |
| JANUARY 12, 2021 | 12:20:00 | DDD.PPTX | YES ▼ |
| JANUARY 13, 2021 | 20:30:00 | EEE.PDF | NO ▼ |
| JANUARY 15, 2021 | 10:50:00 | FFF.PDF | YES ▼ |
| JANUARY 15, 2021 | 22:10:00 | GGG.PPTX | YES ▼ |

INFORMATION PROCESSING SYSTEM, INFORMATION PROCESSING METHOD AND NON-TRANSITORY RECORDING MEDIUM FOR STORING A DETERMINATION RESULT INDICATING WHETHER OUTPUT OF INFORMATION IS SUBJECT TO PROCESSING IN ASSOCIATION WITH INFORMATION RELATED TO THE OUTPUT

CROSS-REFERENCE TO RELATED APPLICATIONS

This patent application is based on and claims priority pursuant to 35 U.S.C. § 119(a) to Japanese Patent Application No. 2021-182474, filed on Nov. 9, 2021, in the Japan Patent Office, the entire disclosure of which is hereby incorporated by reference herein.

BACKGROUND

Technical Field

The present disclosure relates to an information processing system, an information processing method, and a non-transitory recording medium.

Related Art

An increasing number of companies are adopting telework. The telework is a form of flexible work that utilizes information and communication technology and is not subject to time or place restrictions. However, when working from home, for example, various costs such as electricity bill are incurred, which may become a burden on employees.

A technique has been devised for notifying an employer of the power consumed at the home. In such technique, a power consumption management device measures the power consumed by an electrical device connected to the power consumption management device and transmits the power consumption to outside through a communication line.

SUMMARY

Embodiments of the present disclosure describe an information processing system, an information processing method, and a non-transitory recording medium. The information processing system receives from a communication terminal that requests a device to output information related to the output by the device, and stores in one or more memories, a determination result indicating whether the output of the information by the device is subject to processing in association with the information related to the output by the device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6 is a table illustrating an example of entry and exit history information;

FIG. 7 is a table illustrating an example of working time information;

FIG. 8 is a table illustrating an example of document acquisition history information;

FIG. 9 is a table illustrating an example of a print log;

FIG. 10 is a table illustrating an example of determination conditions stored in a determination condition storage unit;

FIGS. 15A and 15B are tables illustrating determination results indicating whether the print job is subject to settlement based on the entry and exit history information;

FIGS. 16A and 16B are tables illustrating determination results indicating whether the print job is subject to settlement based on download history information;

FIGS. 17A and 17B are tables illustrating determination results indicating whether the print job is subject to settlement based on working time information;

FIG. 19 is a diagram illustrating an example of a manual correction screen.

Figure 1:
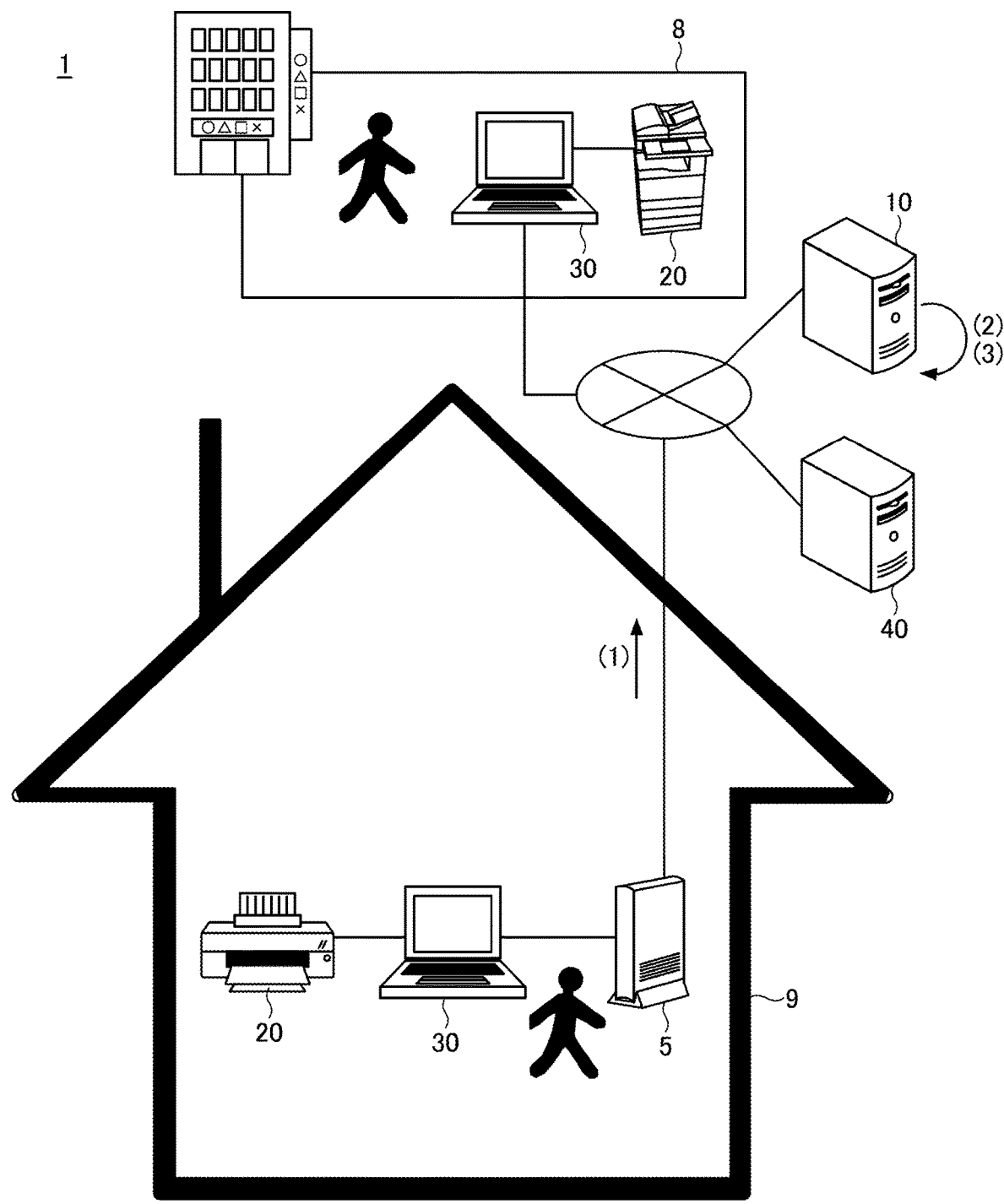
FIG. 1 is a diagram illustrating an outline of determination as to whether cost of a document printed by an employee is subject to settlement.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, as an embodiment of the present disclosure, an output system and an expense settlement determination method (an example of information processing method) performed by the output system are described with reference to the drawings.

FIG. 1 is a diagram illustrating an outline of determination as to whether expense of printing a document by an employee is subject to settlement. A user working for a company may work remotely outside a company office (an example of facility), such as at a home office 9. The user stores a business document (an example of business data) in an external storage server 40, and print the document downloaded from the external storage server 40 at the home office or at the company office.

(1) The terminal 30 at the home office stores a document print log. The terminal 30 transmits the print log to an information processing system 10 of the company through the router 5 at a preset timing such as once a day, week, or month.

(2) The information processing system 10 uses following information to determine whether the print job registered in the print log is subject to settlement.
  A. entry and exit history information to the company office
  B. document download history from the external storage server 40
  C. working time information reported by the employee working remotely By comparing the information A with the printing time of the document, whether the document was printed in the company office is determined by the information processing system 10. Also, the information processing system 10 determines whether the print job is subject to settlement from the information B by determining whether the employee printed the document with the same name as the document downloaded from the external storage server 40. In addition, the information processing system 10 determines whether the printing is subject to settlement by comparing the information C and the printing time of the document, and determining whether the printing was performed during the working time.

(3) The information processing system 10 calculates the printing cost of the print job determined as a subject for settlement, and pays the employee the printing cost as an expense. Accordingly, the employee can settle the printing cost of the business document printed at remote work without any work or with a minimum work for expense settlement.

Being subject to settlement indicates that the employee is allowed to claim the cost of printing from the company (request for settlement). In the present embodiment, the expression subject to settlement or subject to expense reimbursement may be referred to as subject to processing, since being subject to settlement indicates being subject to specific processing, such as calculating the cost of printing at the time of settlement.

The remote work indicates the employee working outside the company office.

"Entry" refers to entering a facility such as a company building or factory where an employee works, and "exit" refers to leaving after work.

The device may be any device that outputs cost-generating output (that is, output that incurs cost) such as printed matter for the user. In the present embodiment, a term "image forming apparatus" is used.

Information related to the output by the device is a record related to the output such as the print job printed by the device. For example, the information indicates who outputs which document and when, from which device, and under what condition. In the present embodiment, information related to the output by the device is called a print log.

In-house devices are devices that are mainly installed in the company facilities. The device installed outside the company but is managed by the company that owns the device is the in-house device.

An employee is a worker employed by the company, a local government, or the like. Employees may include regular employees, temporary employees, contract employees, part-time employees, and the like. The employee may be referred to as a user of the output system.

Figure 2:
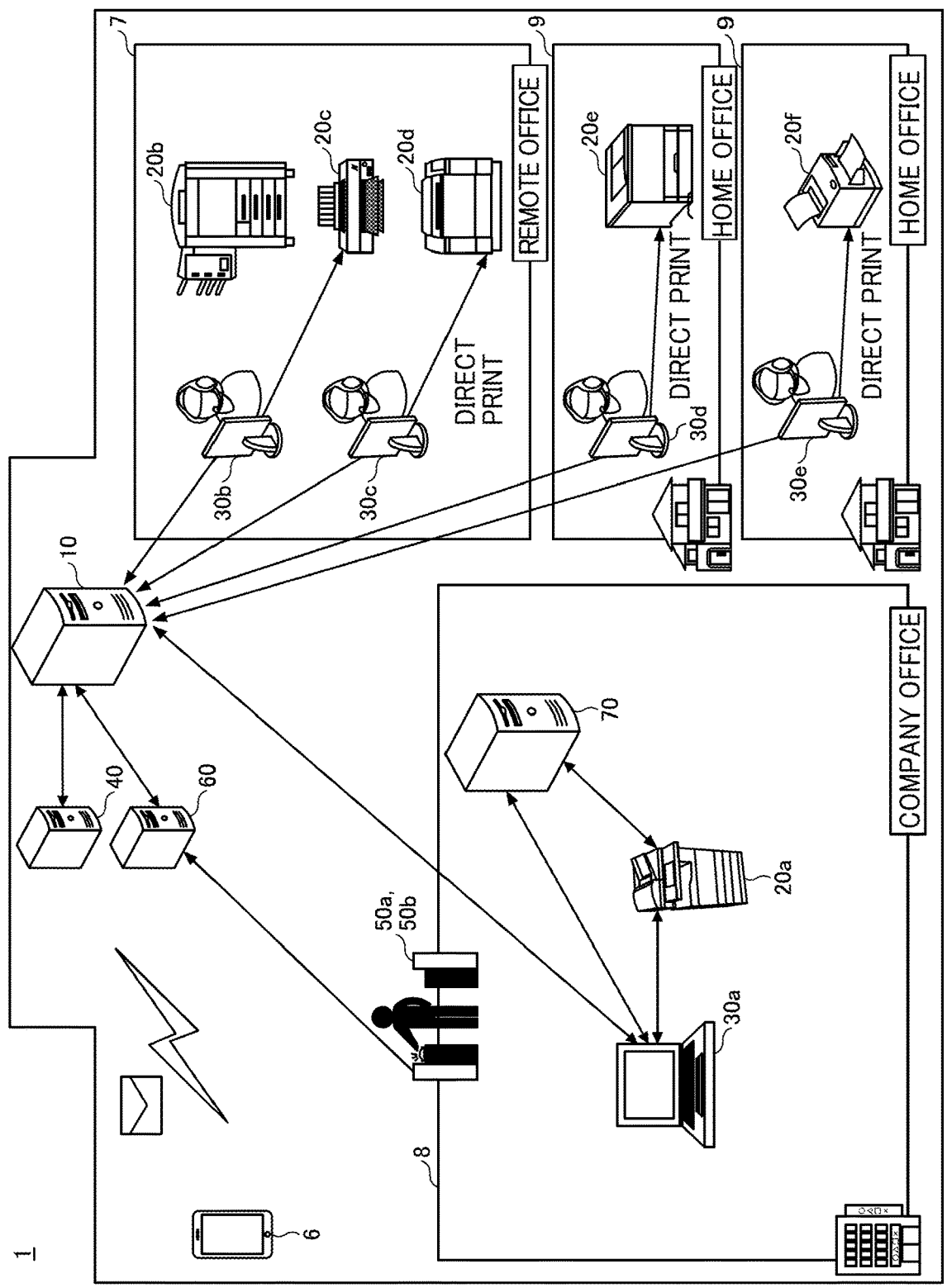
FIG. 2 is a diagram illustrating an example of a system configuration of an output system.

FIG. 2 is a diagram illustrating an example of a system configuration of an output system 1. In FIG. 2, there are three workplaces: a company office 8, a home office 9, and a remote office 7. Of these, the home office 9 and the remote office 7 are working places for the remote work. The home office 9 and the remote office 7 may be simply referred to as "outside the company". That is, the "outside the company" means any situation where the employee physically resides on any place other than the company facility. The location of the employee may be determined by any means, for example, using network location information such as an IP address. In the company office 8, there are one or more image forming apparatuses 20, one or more terminals 30, and a gateway server 70.

In each of the home office 9 and the remote office 7, there are one or more image forming apparatuses 20 and one or more terminals 30. The terminal 30 in the home office 9 and the remote office 7 may be the terminal 30 in the company office 8 brought out by the employee, or the terminal 30 previously installed at home or at the remote office 7. However, an application program (hereinafter referred to as an application) for communicating with the information processing system 10 and transmitting the print log and the like by communicating with the information processing system 10 is installed in the terminal 30 for the home office 9 or the remote office 7.

In the following description, "terminal 30" is used to indicate any terminal 30 among one or more terminals 30a, 30b, and the like. The terminal may be referred to as a communication terminal as it is capable of communication. To indicate any image forming apparatus 20 among one or more image forming apparatuses 20a, 20b, and the like, "image forming apparatus 20" is used.

The remote office 7 may be called a satellite office, a shared office, a coworking space, a rental office, or the like. The remote office 7 is equipped with resources such as the image forming apparatus 20, a conference room, a power supply, and a wireless local area network (LAN) for the employees to work outside the company in the same way as in the company office 8. In most cases, the remote office 7 is a commercial service, but may be provided free of charge by local government, or may be a common facility of an apartment. Also, provided that printing by the image forming apparatus 20 is possible, the employee may work at a coffee shop, internet cafe, or the like.

The image forming apparatus 20 converts the print job transmitted from the terminal into an image, forms the image on paper, fixes the image, and outputs the image. The image forming apparatus 20 may include in addition to a printer function, one or more of a copy function, a facsimile function, a scanner function, and a document box function (i.e., storing data). The image forming apparatus 20 including such multiple functions is called a multifunction peripheral (MFP). Further, the image forming apparatus 20 may be called a printing apparatus or a printer. Further, a printing method of the image forming apparatus 20 includes an electrophotographic method and an inkjet method, but either method may be used in the present embodiment. Also, the image forming apparatuses 20 in the company office 8, home office 9, and remote office 7 may be different in specification such as printing speed and color/black and white.

The image forming apparatus 20 in the company office 8 is preferred to be compatible with pull printing. The pull printing is a mechanism in which the employee registers the print job from the terminal 30 or a mobile terminal 6 in a server, operates the image forming apparatus 20 to download the print job from the server, and prints the print job. The pull printing is sometimes called secure printing or the like. In the present embodiment, the image forming apparatus 20 in the company office 8 downloads the print job from the information processing system 10 (or the gateway server 70) and prints the print job.

The image forming apparatus 20 in the company office 8 may or may not transmit the print log. This difference depends on whether an application for transmitting the print log is installed in the image forming apparatus 20 or not. On the other hand, since the terminal 30 in which the application is installed transmits the print log to the information processing system 10, the same print log may be sent to the information processing system 10 from the terminal 30 and the image forming apparatus 20 by executing a single print job. The information processing system 10 merges print logs by job identifier (ID) or the like. In the present embodiment, the information processing system 10 processes the merged print log. Note that the print log is not transmitted from the image forming apparatus 20 in the home office 9 or the remote office 7 since the application is not installed.

Further, in the present embodiment, the information processing system 10 performs processing to settle the printing cost of business documents printed out of the company, so the image forming apparatus 20 in the company office 8 and the terminal 30 in the company office 8 may not send the print log to the information processing system 10.

The terminal 30 is a computer for the employee to transmit the print job to the image forming apparatus 20 and execute printing. The terminal 30 is a desktop personal computer (PC), a notebook PC, a smartphone, a tablet terminal, or the like that operates on a general operating system (OS) such as WINDOWS (registered trademark), MAC OS (registered trademark), ANDROID (registered trademark), and IOS (registered trademark), etc. In addition, the terminal 30 may be any device capable of operating a predetermined application. The application may be a web application or a native application. In the present embodiment, the application is, for example, a resident application, and previously stores a universal resource locator (URL) or an internet protocol (IP) address of the information processing system 10 or the gateway server 70. In addition, identification information (for example, employee ID, domain, computer name, etc.) of the user of the output system 1 is set in the application.

The information processing system 10 is implemented by one or more information processing apparatuses, and communicates with the terminal 30 or the image forming apparatus 20 through a network. The information processing system 10 receives the print log from the terminal 30 and the image forming apparatus 20, determines whether the print job is subject to settlement, and registers the print log (expense settlement information) to which a determination result is added to the expense settlement system.

The information processing system 10 may be implemented by cloud computing or may be implemented by a single information processing apparatus. The cloud computing refers to a usage pattern in which resources on a network are used without being aware of specific hardware resources.

The information processing system 10 may reside on the internet or may reside on-premises (inside the company office 8).

The gateway server 70 includes several roles. One of the roles is to maintain communication with the information processing system 10 and receive communication from the information processing system 10. Another role is to store the print job in the pull printing. In many cases, the information processing system 10 stores the print job for pull printing, but in some cases the print job is stored in the gateway server 70. Another role of the gateway server 70 is to transmit the print log to the information processing system 10. In the terminal 30 or the image forming apparatus 20, the employee sets whether to send the print log to the information processing system 10 or to the gateway server 70.

As described above, the gateway server 70 enables the customer to execute printing even when the communication between the terminal 30 or the image forming apparatus 20 and the information processing system 10 is interrupted, and since the gateway server 70 is a device for operating the output system 1 as much as possible within the company office 8, the gateway server 70 may not be provided in the present embodiment. In the present embodiment, description of communication through the gateway server 70 is omitted.

The external storage server 40 is one or more information processing apparatuses that store the business document. Login ID and password of the external storage server 40 are assigned to the employee to store the business document. Accordingly, the information processing system 10 acquires the document download history for each employee using the login ID and password of each employee.

The attendance management system 60 records the employee's entry history and working time. An integrated circuit (IC) card reader placed at an entrance gate 50a and an exit gate 50b of the workplace reads an IC card carried by the employee and records the entry history for each employee. Also, when the employee is not coming to the company office (remote work), the employee connects the terminal 30 to the information processing system from outside the company and clocks (causes to enter) the work start time and work end time from the website. The clocking method is not limited to the above method and the employee may send an e-mail at the start and end of work. The employee does not report the working time when working in the company office.

Hardware configurations of the information processing system 10, the terminal 30, and the image forming apparatus 20 included in the output system 1 according to the present embodiment are described in the following.

Figure 3:
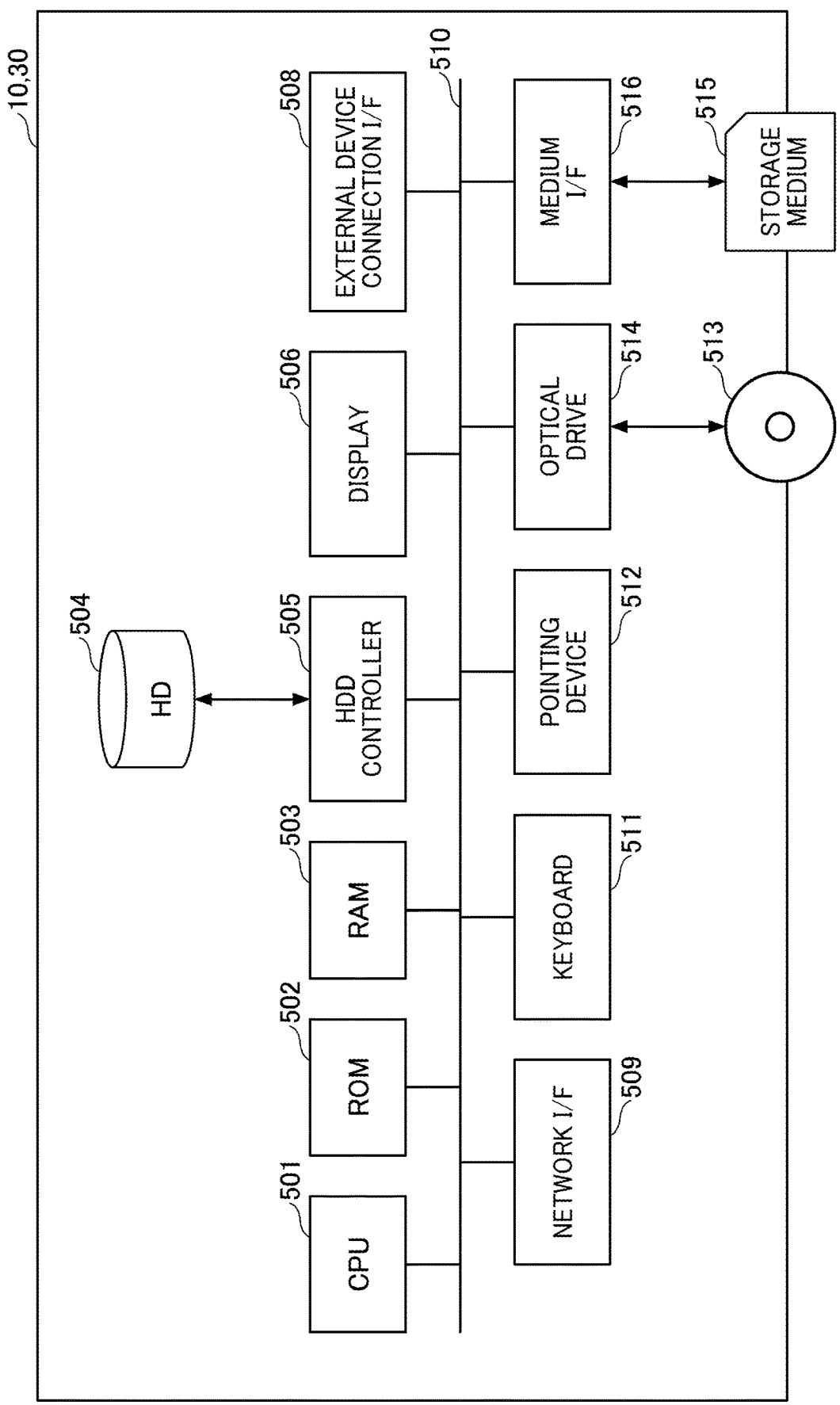
FIG. 3 is a block diagram illustrating a hardware configuration of an example of an information processing system and a terminal.

FIG. 3 is a block diagram illustrating the hardware configuration of an example of the information processing system 10 and the terminal 30. As illustrated in FIG. 3, the information processing system 10 and the terminal 30 are implemented by a computer including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, network I/F 509, a bus line 510, a keyboard 511, a pointing device 512, an optical drive 514 and a medium I/F 516.

The CPU 501 controls overall operation of the information processing system 10 and the terminal 30. The ROM 502 stores a control program such as an initial program loader (IPL) to boot the CPU 501. The RAM 503 is used as a work area for the CPU 501. The HD 504 stores various data such as the programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a Universal Serial Bus (USB) memory or a printer. The network I/F 509 is an interface for performing data communication using the communication network N2. The bus line 510 is an address bus, a data bus, or the like for electrically connecting each component such as the CPU 501 illustrated in FIG. 3.

The keyboard 511 is an example of an input device provided with a plurality of keys for allowing a user to input characters, numerals, or various instructions. The pointing device 512 is another example of the input device that allows a user to select or execute a specific instruction, select a target for processing, or move a cursor being displayed. The optical drive 514 controls reading or writing of various data to an optical storage medium 513 as an example of a removable storage medium. The optical storage medium 513 may be a Compact Disc (CD), Digital Versatile Disc (DVD), BLU-RAY (registered trademark), or the like. The medium I/F 516 controls reading and writing (storing) of data from and to a storage medium 515 such as a flash memory.

Figure 4:
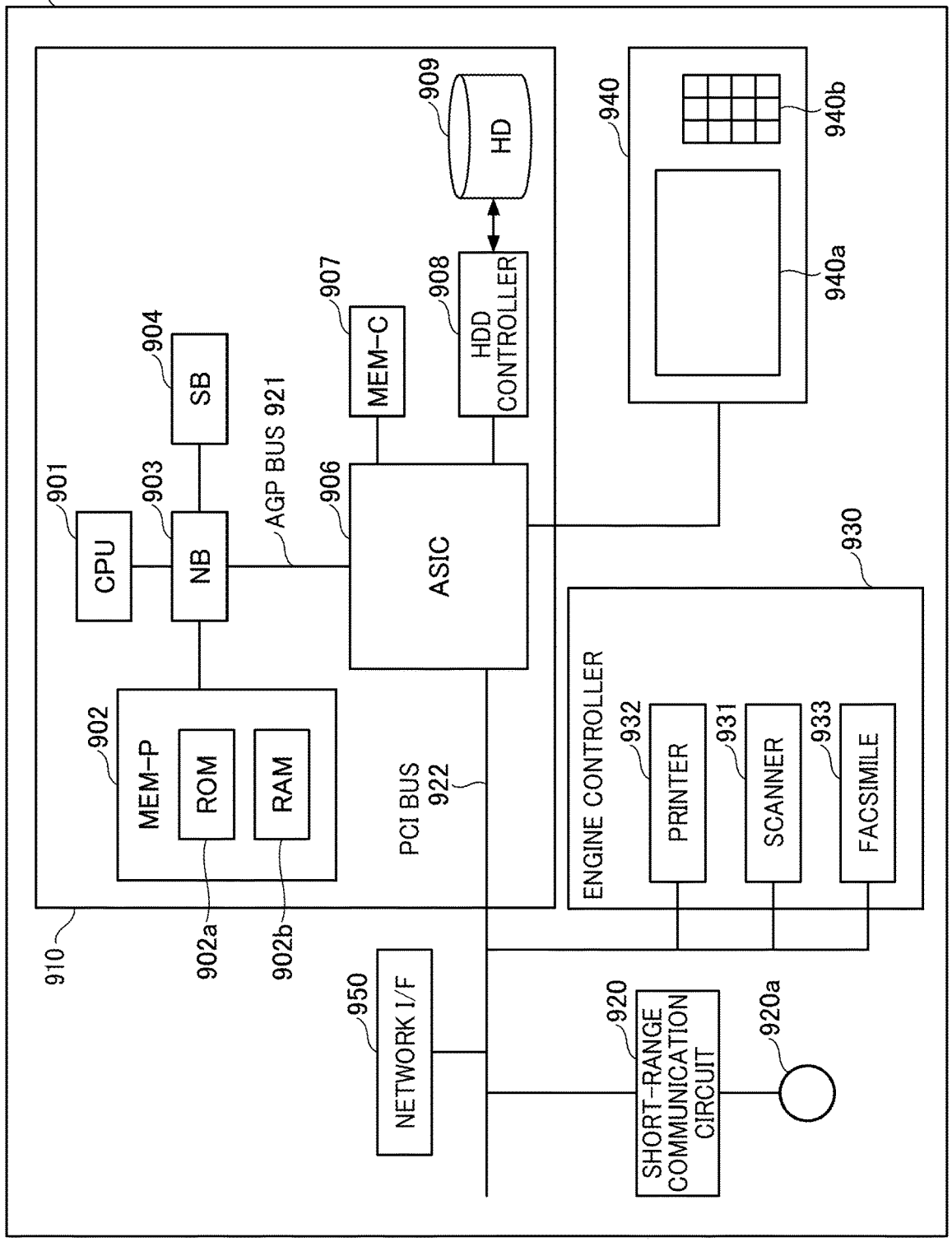
FIG. 4 is a block diagram illustrating a hardware configuration of an example of an image forming apparatus.

FIG. 4 is a block diagram illustrating a hardware configuration of the image forming apparatus 20. As illustrated in FIG. 4, the image forming apparatus 20 includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

The CPU 901 is a processor that performs overall control of the image forming apparatus 20. The NB 903 connects the CPU 901 with the MEM-P 902, SB 904, and AGP bus 921 and includes a memory controller for controlling reading or writing operation of various data with respect to the MEM-P 902, a Peripheral Component Interconnect (PCI) master, and an AGP target.

The MEM-P 902 includes a ROM 902*a* as a memory that stores program and data for implementing various functions of the controller 910. The MEM-P 902 further includes a RAM 902*b* as a memory that deploys the program and data, or as a drawing memory that stores drawing data for printing. The program stored in the ROM 902*a* may be stored in any computer-readable storage medium, such as a compact disc-read only memory (CD-ROM), compact disc-recordable (CD-R), or DVD, in a file format installable or executable by the computer for distribution.

The SB 904 is a bridge for connecting the NB 903 with a peripheral component interconnect (PCI) device or a peripheral device. The ASIC 906 is an IC dedicated to an image processing use, and connects the AGP bus 921, a PCI bus 922, the HDD controller 908, and the MEM-C 907 as a bridge. The ASIC 906 is a PCI target and an AGP master, an arbiter (ARB) which is the core of the ASIC 906, a memory controller which controls MEM-C 907, a plurality of Direct Memory Access Controllers (DMACs) which rotate image data by hardware logic and the like, and a PCI unit that transfers data between a scanner 931, a printer 932, and a facsimile 933 through the PCI bus 922. The ASIC 906 may be connected to a Universal Serial Bus (USB) interface or an Institute of Electrical and Electronics Engineers 1394 (IEEE 1394) interface.

The MEM-C 907 is a local memory, which is used as a buffer for image data to be copied or code image. The HD 909 is a storage that stores image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920*a*. The short-range communication circuit 920 is a communication circuit that communicates in compliance with Near Field Communication (NFC), BLUETOOTH (registered trademark) and the like.

The engine controller 930 includes the scanner 931, the printer 932, and the facsimile 933. The control panel 940 includes a display panel 940*a* implemented by, for example, a touch panel that displays current settings or a selection screen and receives a user input and an operation panel 940*b* including a numeric keypad that receives set values of various image forming parameters such as image density parameter and a start key that accepts an instruction for starting copying. The controller 910 controls entire operation of the image forming apparatus 20. For example, the controller 910 controls rendering, communication, or user inputs to the control panel 940. The scanner 931 or the printer 932 includes image processing functions such as error diffusion processing and gamma conversion processing.

In response to an instruction to select a specific application through the control panel 940, for example, using a mode switch key, the image forming apparatus 20 selectively performs a document box function, a copy function, a print function, and a facsimile function. In the image forming apparatus 20, a document box mode is selected when the document box function is selected, a copy mode is selected when the copy function is selected, a print mode is selected when the print function is selected, and a facsimile mode is selected when the facsimile function is selected.

The network I/F 950 controls communication of data with an external device through the communication network. The short-range communication circuit 920 and the network I/F 950 are electrically connected to the ASIC 906 through the PCI bus 922.

Figure 5:
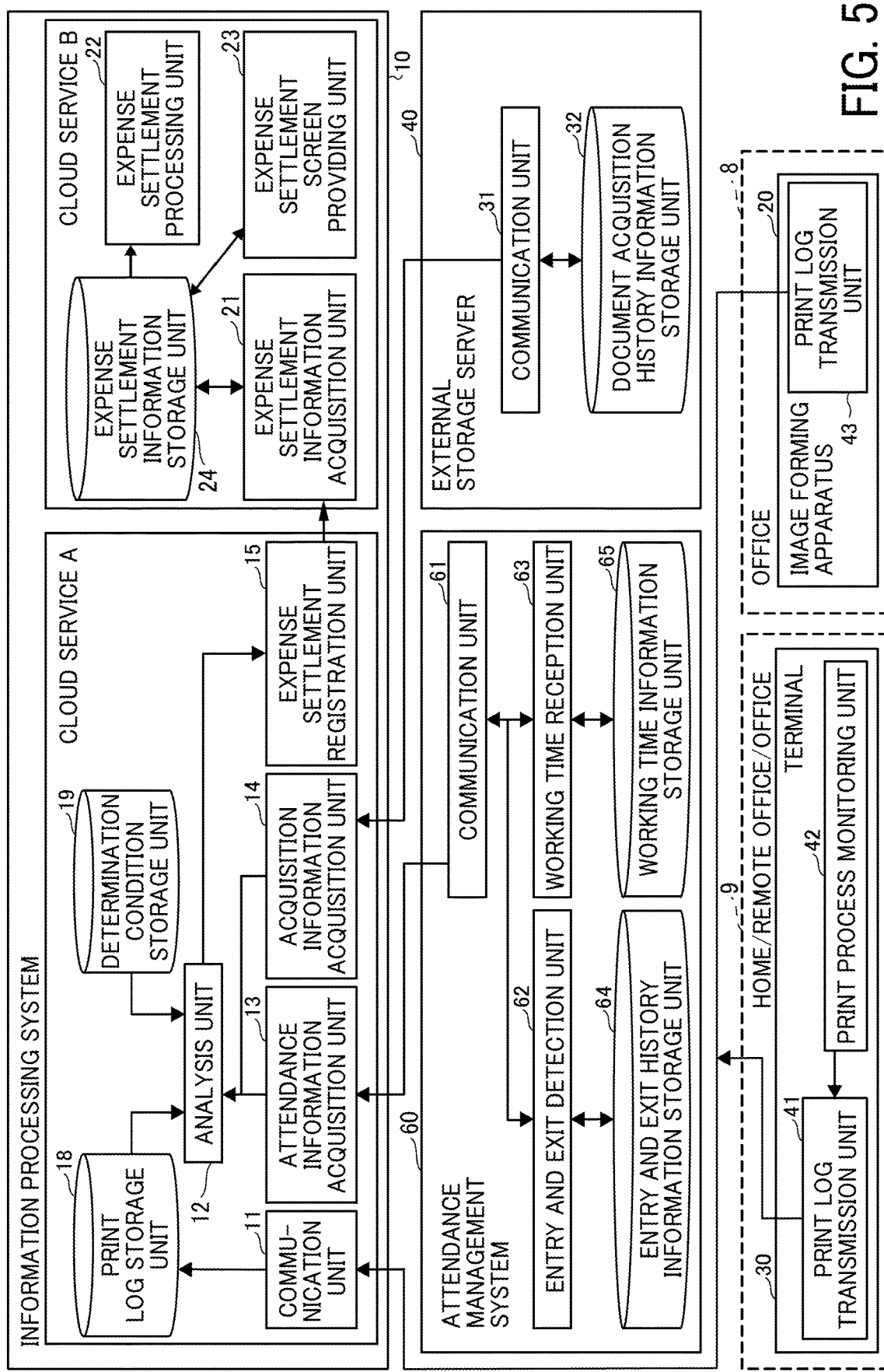
FIG. 5 is a block diagram illustrating a functional configuration of an example of the output system.

With reference to FIG. 5, a functional configuration of the output system 1 according to the present embodiment is described. FIG. 5 is a block diagram illustrating a functional configuration of an example of the output system 1.

The terminal 30 includes a print log transmission unit 41 and a print process monitoring unit 42. Each functional unit of the terminal 30 is a function implemented by the CPU 501 executing commands included in one or more programs installed in the terminal 30. This configuration may be the same at the home office 9, the company office 8, and the remote office 7.

The terminal 30 may request the image forming apparatus 20 to execute a print job, or may transmit the print job to the information processing system 10 and the image forming apparatus 20 downloads the print job (pull print). The following functions of the terminal 30 are functions used in the case the terminal 30 requests the image forming apparatus 20 to execute the print job. In the case of pull print (performed in-house), the image forming apparatus 20 transmits the print log to the information processing system 10.

In response to the employee printing a document from word processing software or the like running on the terminal 30, the print process monitoring unit 42 obtains from the printer driver, information on the print job passed from the word processing software to a printer driver. The print process monitoring unit 42 transmits the print job to the print log transmission unit 41.

The print log transmission unit 41 transmits the print log in which one or more print jobs are accumulated to the information processing system 10. The print log transmission unit 41 may transmit the print log in real time, may transmit the print log at regular time intervals, or may transmit the print log when a certain amount of print logs is accumulated.

Note that FIG. 5 illustrates specific features of the present embodiment, and omits the general functions (display control unit, operation reception unit, etc.) of the terminal 30.

The following functions of the image forming apparatus 20 are functions used in the case the terminal 30 requests the image forming apparatus 20 to execute the print job and when printing is performed by pull printing.

The image forming apparatus 20 in the company office 8 includes a print log transmission unit 43. Each functional unit included in the image forming apparatus 20 is a function implemented by the CPU 901 illustrated in FIG. 4 executing commands included in one or more programs (applications) installed in the image forming apparatus 20. Note that the image forming apparatus 20 at the home office 9 or the remote office 7 does not transmit the print log to the information processing system 10 because the application is not installed.

The print log transmission unit 43 transmits the print log accumulated by the image forming apparatus 20 to the information processing system 10. The print log transmission unit 43 may transmit the print log in real time, may transmit the print log at regular time intervals, or may transmit the print log when a certain amount of print logs is accumulated.

Note that since the print jobs are merged in the information processing system 10 as described above, the print log transmission unit 43 may transmit the print logs to the information processing system 10 regardless of whether the print job is executed by pull printing or directly from the terminal 30. The print log may include information stating that the print job is printed by pull print.

The attendance management system 60 includes a communication unit 61, an entry and exit detection unit 62, and a working time reception unit 63. Each functional unit of the attendance management system 60 is a function implemented by the CPU 501 executing commands included in one or more programs installed in the attendance management system 60. The attendance management system 60 also includes a working time information storage unit 65 and an entry and exit history information storage unit 64 implemented in the HD 504, RAM 503, or the like illustrated in FIG. 3.

In response to a request from the information processing system 10, or at a preset timing such as once a day, the communication unit 61 transmits the working time information stored in the working time information storage unit 65 and the entry and exit history information stored in the entry and exit history information storage unit 64 to the information processing system 10.

The entry and exit detection unit 62 receives the card number read from the IC card reader provided at the entrance gate 50a through which the employee enters and the exit gate 50b through which the employee exits. The card number is associated with the employee ID, and the entry and exit detection unit 62 records the entry history and exit history of each employee in the entry and exit history information storage unit 64.

The working time reception unit 63 receives a report of working time of the employee at the remote work.

The working time reception unit 63 serves as a web server to provide a web page for inputting working time to the terminal 30 and stores the work start time and work end time reported by the employee in the working time information storage unit 65. The working time is to be reported in the case the employee is working remotely. In the case working time is input by the employee currently in the company, priority is given to the entry history.

FIG. 6 is a table illustrating an example of the entry and exit history information. As illustrated in FIG. 6, the entry and exit history information is a list of entry time and exit time of a corresponding date. The entry time is the time when the employee passes through the entrance gate 50a, and the exit time is the time when the employee passes through the exit gate 50b. The entry time and exit time are recorded in the case the employee came to the company. The print jobs executed between the entry time and the exit time may be determined that the in-house image forming apparatus 20 is used.

FIG. 7 is a table illustrating an example of working time information. As illustrated in FIG. 7, the working time information is a list of work start time and work end time of a corresponding date. The work start time is the time when the employee started to work, and the work end time is the time when the employee finished to work. A print job executed between the work start time and the work end time is determined to be subject to settlement, even though the print job is executed outside the company office.

Returning to FIG. 5, description continues. The external storage server 40 includes a communication unit 31. Each functional unit of the external storage server 40 is a function implemented by the CPU 501 executing instructions included in one or more programs installed on the external storage server 40. The external storage server 40 also includes a document acquisition history information storage unit 32 implemented in the HD 504, RAM 503, and the like illustrated in FIG. 3.

The communication unit 31 sends the document acquisition history information stored in the document acquisition history information storage unit 32 to the information processing system 10 in response to a request from the information processing system 10 or at a preset timing such as once a day.

FIG. 8 is a table illustrating an example of the document acquisition history information. As illustrated in FIG. 8, the document acquisition history information is a list of document names associated with download date and time.

The document name may be a file name. Since the external storage server 40 is a storage area allocated to the employees by the company, stored documents are assumed to be documents used in business.

The information processing system 10 includes two functions of cloud services A and B. The cloud services A and B may be provided as one service, or may be provided independently one by one as illustrated in FIG. 5. Further, the cloud services A and B may be implemented in separate information processing apparatuses, or may be implemented in one information processing apparatus.

The main functions of the cloud services A and B are as follows.

The cloud service A is a print job analysis service. The cloud service B is an expense settlement service (expense settlement system).

The print log transmitted from the terminal 30 or the image forming apparatus 20 is determined by the cloud service A as to whether the print log is subject to settlement. The cloud service A includes a communication unit 11, an analysis unit 12, an attendance information acquisition unit 13, an acquisition information acquisition unit 14, and an expense settlement registration unit 15. Each functional unit of the cloud service A is a function implemented by the CPU 501 executing commands included in one or more programs installed in the information processing system 10. The same description applies to the cloud service B.

The cloud service A also includes a print log storage unit 18 and a determination condition storage unit 19 implemented in the HD 504 or the like in FIG. 3.

The communication unit 11 receives the print jobs from the terminal 30 and the image forming apparatus 20. The communication unit 11 may simply receive the print log transmitted from the terminal 30 or the image forming apparatus 20, or may inquire of the terminal 30 or the image forming apparatus 20 about presence of the print log. The communication unit 11 stores the received print log in the print log storage unit 18.

The attendance information acquisition unit 13 acquires the working time information and the entry and exit history information from the attendance management system 60. The acquisition information acquisition unit 14 acquires document acquisition history information from the external storage server 40.

The analysis unit 12 determines whether the print log is subject to settlement or not subject to settlement using a determination condition stored in the determination condition storage unit 19. The analysis unit 12 registers a determination result indicating whether the print job is subject to settlement or not subject to settlement in the print log.

The expense settlement registration unit 15 transmits a print log attached with the determination result indicating "subject to settlement" or "not subject to settlement" (referred to as expense settlement information) to the information processing system 10 as expense settlement information.

FIG. 9 is a table illustrating an example of the print log. The print log is a list of print jobs. The print log includes items such as an ID, print date, print time, number of prints (black and white), number of prints (full color), document name, and determination result for settlement.

The ID is print job identification information.

The print date and print time are the date and time when the image forming apparatus executed the print job.

The number of printed pages (black and white) is the number of black and white pages printed in the print job.

The number of printed pages (full color) is the number of full color pages printed in the print job.

The document name is the file name of the printed document.

The determination result for settlement is the determination result indicating whether the print job is subject to settlement. The document subject to settlement is a document presumed to be printed outside the company. YES indicates that the print job is subject to settlement, and NO indicates that the print job is not subject to settlement.

FIG. 10 is a table illustrating the determination condition stored in the determination condition storage unit 19. Each item of the determination condition is described below. The condition number is identification information of the determination condition. In FIG. 10, three determination conditions are illustrated as an example.

Condition 01 is "print time is in between the entry time and the exit time". Condition 02 is "document name is the same as the file name downloaded from the external storage server 40". Condition 03 is "print time is included in the working time".

First, in condition 01, in the case the print time is included in between the entry time and the exit time, the print job is determined not subject to settlement, since the printing is done during the time when the employee is in the company. The analysis unit 12 does not consider the conditions 02 and 03 in making determination based on the condition 01.

Next, in condition 02, even in the case the document is printed while the employee is outside the company, the print job is determined as subject to settlement since the document downloaded from the external storage server 40 is the document for business use. The analysis unit 12 does not consider the condition 03 in making determination based on the condition 02.

Next, in condition 03, the print job printed during working time is subject for settlement since the printing during the working time is the printing during the remote work.

The determination may be preferred to be done in the order of condition 01, condition 02, and condition 03 to avoid making determination over again. (Because the condition 01 is superior to the condition 02 and the condition 02 is superior to the condition 03).

The analysis unit 12 determines that the print job that satisfies the condition 01 is not subject to settlement. The analysis unit 12 determines that the print log that satisfies either condition 02 or 03 is subject to expense settlement.

The cloud service B includes an expense settlement information acquisition unit 21, an expense settlement processing unit 22, and an expense settlement screen providing unit 23. The cloud service B also includes an expense settlement information storage unit 24 implemented in the HD 504 or the like in FIG. 3.

The expense settlement information acquisition unit 21 acquires from the cloud service A the expense settlement information related to the print log to which the determination result of "subject to settlement" or "not subject to settlement" is attached. The expense settlement information is stored in the expense settlement information storage unit 24.

The expense settlement processing unit 22 settles expenses based on the expense settlement information stored in the expense settlement information storage unit 24. Specifically, the expense settlement processing unit 22 calculates the expense for each employee for the print job to be settled on a closing date such as the end of the month, and processes the expense to be paid to the employee.

The expense settlement screen providing unit 23 provides the expense settlement screen to the terminal 30 and receives correction in the expense settlement from the employees.

Figure 11:
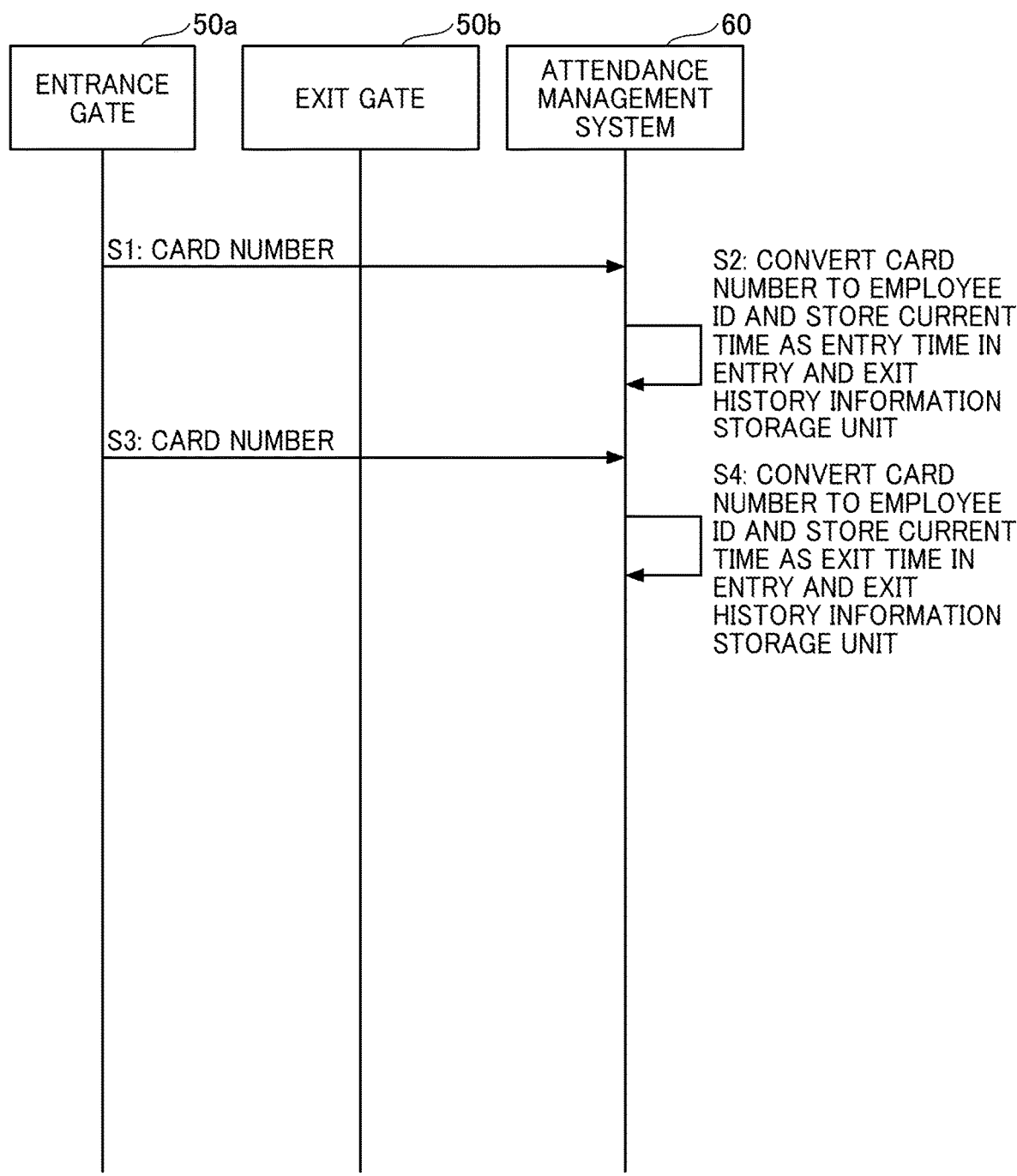
FIG. 11 is a sequence diagram illustrating an example of a process executed by an information processing system to record entry time and exit time of each employee.

FIG. 11 is a sequence diagram illustrating an example of a process executed by the information processing system 10 to record the entry time and exit time of each employee.

S1: In response to the employee holding the IC card over the entrance gate 50a, the IC card reader reads and transmits the card number to the attendance management system 60.

S2: The entry and exit detection unit 62 converts the card number into the employee ID, and stores the present time in the entry and exit history information storage unit 64 as the entry time.

S3: In response to the employee holding the IC card over the exit gate 50b, the IC card reader reads and transmits the card number to the attendance management system 60.

S4: The entry and exit detection unit 62 converts the card number into the employee ID, and stores the present time in the entry and exit history information storage unit 64 as the exit time.

As described above, the entry time and exit time are recorded for each employee.

Figure 12:
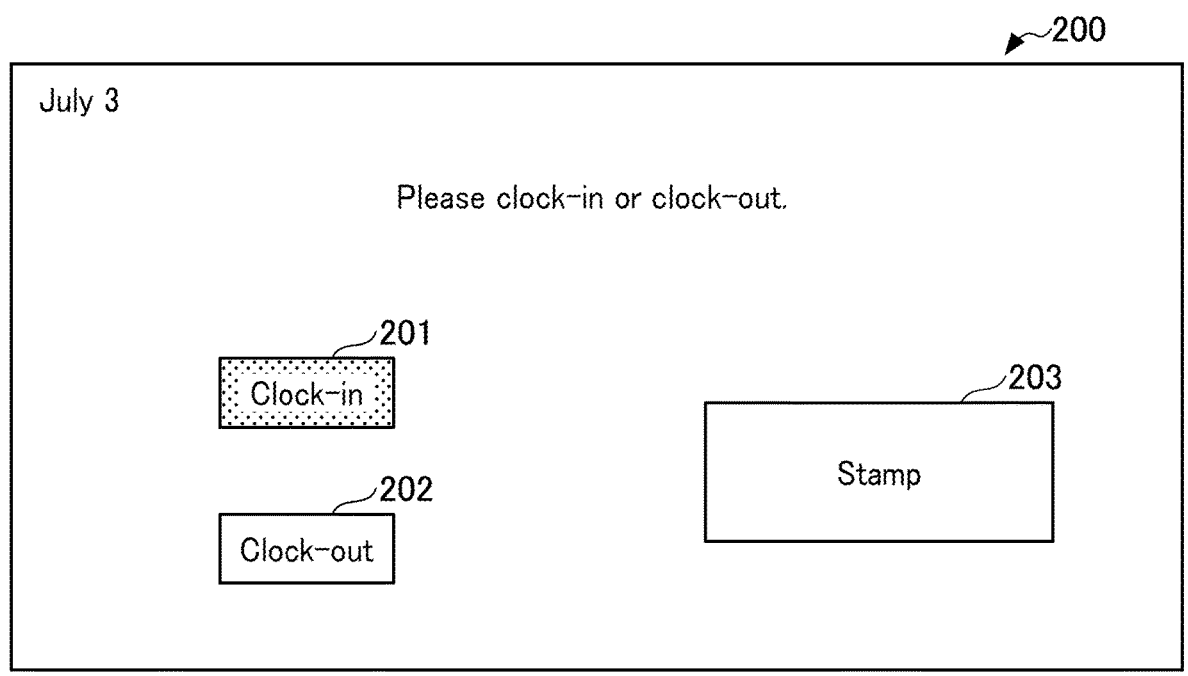
FIG. 12 is a diagram illustrating an example of a working time reporting screen displayed by a terminal.

FIG. 12 is a diagram illustrating an example of a working time reporting screen 200 displayed by the terminal 30. The working time reporting screen 200 is a screen displayed when the terminal 30 is connected to the attendance management system 60. The employee ID is specified by logging in.

The working time reporting screen 200 includes a clock-in button 201, a clock-out button 202, and a stamp button 203. The employee presses the stamp button 203 with the clock-in button 201 selected at start of the remote work and presses the stamp button 203 with the clock-out button 202 selected at end of the remote work. In response to a pressing of the stamp button 203, the attendance management system 60 is notified that the employee has started to work or has end the work and the working time reception unit 63 stores the work start time or work end time in the working time information storage unit 65 in association with the employee ID.

Figure 13:
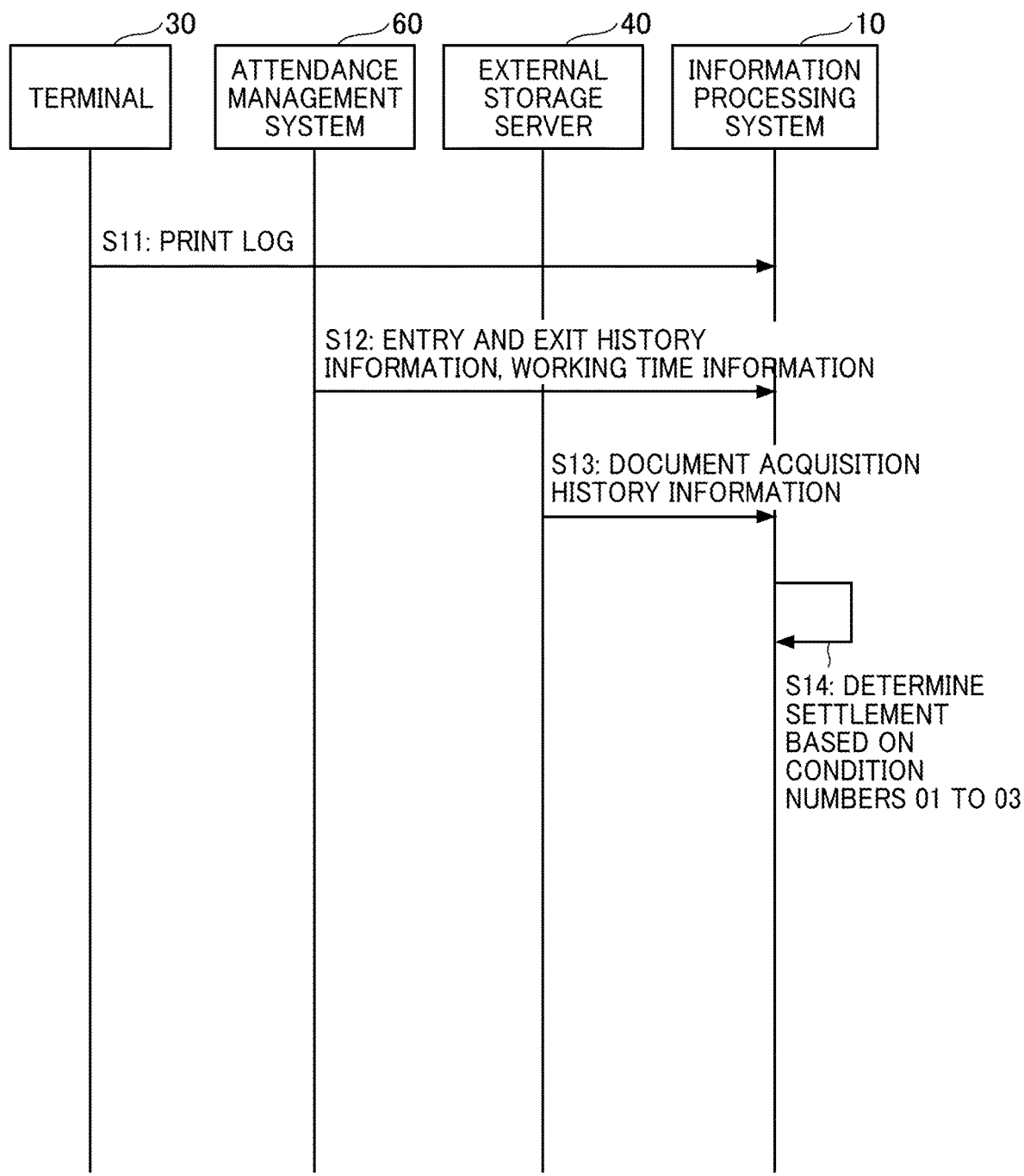
FIG. 13 is a sequence diagram illustrating an example of an overall process for determining whether a print job included in the print log is subject to settlement.

FIG. 13 is a sequence diagram illustrating an example of an overall process for determining whether the print job included in the print log is subject to settlement.

S11: The print log transmission unit 43 of the terminal 30 transmits the print log to the information processing system 10. The transmission may be made at each printing, at a preset time, or at any timing when a certain amount of print logs is accumulated. The terminal 30 may be provided either in the company or outside the company. The communication unit 11 of the information processing system 10 receives the print log and stores the print log in the print log storage unit 18.

S12: The communication unit 61 of the attendance management system 60 transmits the entry and exit history information and the working time information to the information processing system 10. The transmission may be made at each entry into the building, leaving the building, start of work, or end of work, at a preset time, or at any timing when a certain amount of entry and exit history information and work time information is accumulated. Also, the entry and exit history information and the working time information may be transmitted at different timings. The attendance information acquisition unit 13 of the information processing system 10 acquires the entry and exit history information and the working time information.

S13: The communication unit 31 of the external storage server 40 transmits the document acquisition history information to the information processing system 10. The transmission may be made at each acquisition of a document, at a preset time, or at any timing when a certain amount of document acquisition history information is accumulated.

The acquisition information acquisition unit 14 of the information processing system acquires document acquisition history information.

S14: The analysis unit 12 of the information processing system 10 uses conditions 01 to 03 stored in the determination condition storage unit 19 to determine whether each print job is subject to settlement. The details of determination process is described with reference to FIGS. 14 to 17.

Figure 14:
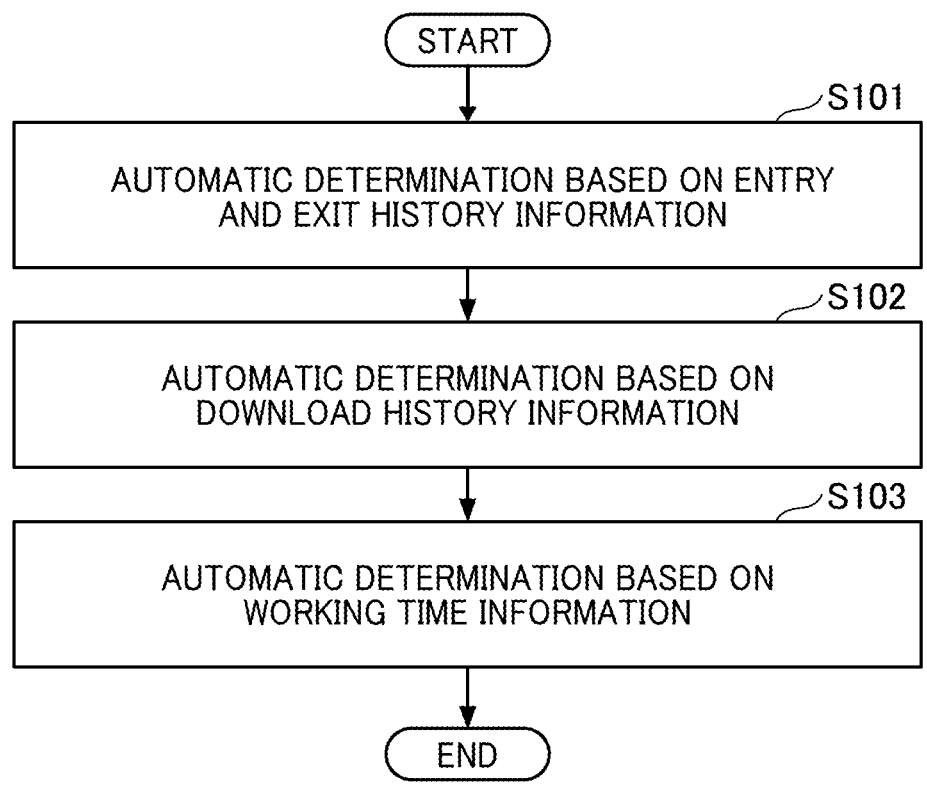
FIG. 14 is a flowchart illustrating an example of a process for an analysis unit to determine whether each print job is subject to settlement.

FIG. 14 is a flowchart illustrating an example of a process for the analysis unit 12 to determine whether each print job is subject to settlement.

S101: The analysis unit 12 determines whether the print job is subject to settlement based on the entry and exit history information. Details are described below with reference to FIG. 15.

S102: The analysis unit 12 determines whether the print job is subject to settlement based on the download history information. Details are described below with reference to FIG. 16.

S103: The analysis unit 12 determines whether the print job is subject to settlement based on the working time information. Details are described below with reference to FIG. 17.

By making determinations in this order, redundant determination for print job is eliminated.

FIGS. 15A and 15B are tables illustrating the determination result based on the entry and exit history information indicating whether the print job is subject to settlement. FIG. 15A illustrates the entry and exit history information, and FIG. 15B illustrates the determination result based on the entry and exit history information. Note that FIG. 15A is the same as FIG. 6, presented again to facilitate understanding.

According to the entry and exit history information, the entry time on Jan. 10, 2021, is 9:00, and the exit time is 17:30. According to the print log, a print job printed at 13:50 on Jan. 10, 2021, is determined to be printed during the time the employee was present in the company, so the analysis unit 12 determines that the print job is not subject to settlement (determination result is NO).

FIGS. 16A and 16B are tables illustrating determination result indicating whether the print job is subject to settlement based on download history information. FIG. 16A illustrates the download history information, and FIG. 16B illustrates the determination result based on the download history information. Note that FIG. 16A is the same as FIG. 8, presented again to facilitate understanding. Since the condition 01 is superior to the condition 02 and the condition 02 is superior to the condition 03, the analysis unit 12 makes determination for the print job that determination is not made under the condition 01.

According to the download history information, documents "CCC.docx" and "GGG.pptx" are downloaded. According to the print log, there are print jobs for documents "CCC.docx" and "GGG.pptx". The analysis unit 12 determines that these two print jobs (IDs=JOB3, JOB7) are subject to settlement (determination result is YES) regardless of whether the print jobs are output within the working time or not.

A positive determination for settlement may be made based on the date of download and the date of printing being the same in addition to matching the file name, or printing performed within a certain period of time from the time of download (negative determination is made based on a certain amount of time between the download and the printing.)

FIGS. 17A and 17B are tables illustrating the determination result indicating whether the print job is subject to settlement based on the working time information. FIG. 17A illustrates the working time information, and FIG. 17B illustrates the determination result based on the working time information. Note that FIG. 17A is the same as FIG. 7, presented again to facilitate understanding. Since the condition 01 is superior to the condition 02 and the condition 02 is superior to the condition 03, the analysis unit 12 makes determination for the print job that is not determined under the conditions 01 and 02.

According to the working time information, the employee worked from 9:00 to 17:30 each day from Jan. 11, 2021, to Jan. 15, 2021. According to the print log, the print job with ID JOB2 is printed during the working time, the print job with ID JOB4 is printed during the working time, the print job with ID JOB5 is printed outside the working time, and the print job with ID JOB6 is printed during working time. The analysis unit 12 determines that the print jobs with IDs JOB2, JOB4, and JOB6 are subject to settlement, and the print job with ID JOB5 is not subject to settlement.

Since the condition 01 is superior to the condition 02 and the condition 02 is superior to the condition 03, provided that the analysis unit 12 is making determination in this order, the analysis unit 12 makes determination for the print job that the determination is not made. In the case the determination is not made in this order, the analysis unit 12 is to make determination again for the print job already determined.

Figure 18:
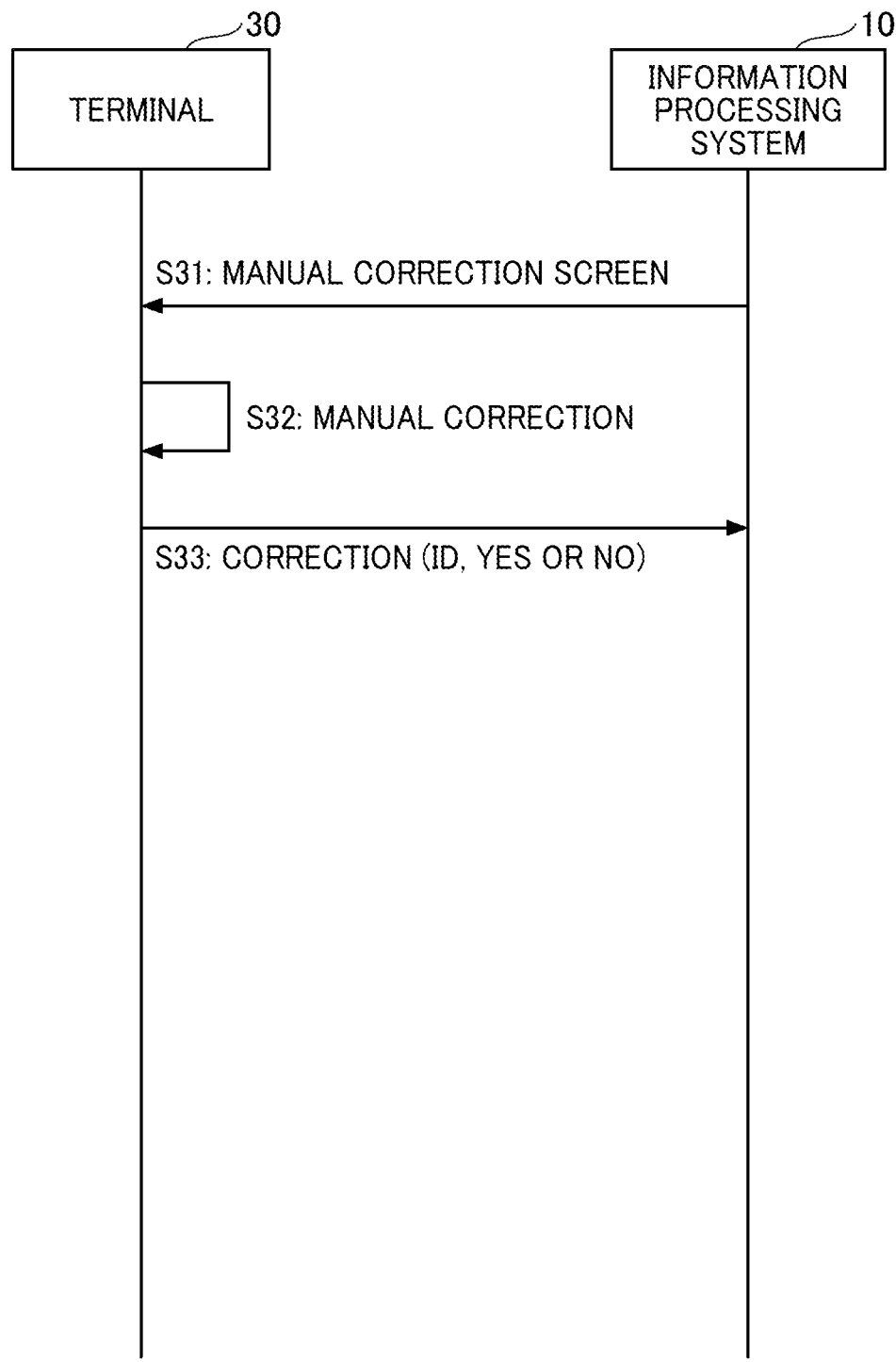
FIG. 18 is a sequence diagram illustrating an example of a process for manually correcting whether the print job is subject to settlement by an employee.

FIG. 18 is a sequence diagram illustrating an example of a process of manually correcting whether the print job is subject to settlement by the employee. For example, before the closing date such as the end of the month, the cloud service B prompts by an e-mail or the like to reconsider the determination of whether the print job is subject to settlement.

S31: The employee logs into the information processing system 10 by operating the terminal 30. The employee ID is identified by logging in. In response to a request by the employee for a manual correction screen to manually correct whether the print job is subject to settlement, the expense settlement screen providing unit 23 of the information processing system 10 provides the terminal 30 with the manual correction screen including the print log associated with the employee ID.

S32: The terminal 30 receives and displays the screen information of the manual correction screen. An example of the manual correction screen is illustrated in FIG. 19. The employee corrects the determination result indicating whether any print job is subject to settlement. The terminal 30 receives the correction.

S33: The terminal 30 transmits the correction to the information processing system 10. The expense settlement screen providing unit 23 corrects the determination result of the print job subject to settlement of the expense settlement information stored in the expense settlement information storage unit 24 according to the correction.

FIG. 19 is a diagram illustrating an example of the manual correction screen 210. The manual correction screen 210 includes correction buttons 214 in association with print date 211, print time 212, and document name 213. The correction button 214 is a pull-down menu displaying YES or NO. By selecting YES or NO from the pull-down menu, the employee corrects whether each print job is subject to settlement.

According to the present embodiment, whether the print job is subject for settlement is determined based on the conditions 01 to 03.

By making determinations in the order of conditions 01 to 03, duplicated determination is prevented. Accordingly, the employee can settle the printing cost of the business document printed by remote work without any work or a minimum work for cost settlement.

For example, in the present embodiment, a method for settling the cost of the printing during remote work is described, but the method may be applied to any output that incurs a cost for output and whose output record can be transmitted to the information processing system 10.

Further, the configuration example of FIG. 5 and the like is divided according to main functions in order to facilitate understanding of processing by the terminal 30, the image forming apparatus 20, and the information processing system 10. The present disclosure is not limited by the way of dividing the processing unit or the name. The processing of the terminal 30, the image forming apparatus 20, and the information processing system 10 may be divided into more processing units according to the content of the processing. Further, one process may be divided to include a larger number of processes.

The apparatuses or devices described in one or more embodiments are just one example of plural computing environments that implement the one or more embodiments disclosed herein. In some embodiments, information processing system 10 includes multiple computing devices, such as a server cluster. The plurality of computing devices is configured to communicate with one another through any type of communication link, including a network, shared memory, etc., and perform the processes disclosed herein.

Further, the information processing system 10 may be configured to share the processing steps disclosed in the present embodiment, for example, FIG. 13 in various combinations. For example, a process executed by a given unit may be executed by a plurality of information processing apparatuses included in the information processing system 10. Further, the information processing system 10 may be integrated into one server or may be divided into a plurality of devices.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing system comprising:
circuitry configured to:
receive from a communication terminal that requests a device to output information related to the output by the device;

store in one or more memories, a determination result indicating whether the output of the information by the device is subject to processing in association with the information related to the output by the device;

acquire entry and exit history information indicating a time period during which a user is in a facility; and determine that the output of the information having been output during the time period indicated by the entry and exit history information is not subject to processing.

2. The information processing system of claim 1, wherein the circuitry is further configured to:

acquire from an external storage server that stores business data, acquisition history information indicating acquisition of the business data; and determine that the output of the information is subject to processing in a case the information related to the output indicates that the output of the information is the output of the business data included in the acquisition history information.

3. The information processing system of claim 2, wherein the circuitry is further configured to:

acquire working time information of the user working outside the facility;

determine that the output of the information is subject to processing in a case the output is output within working time registered in the working time information; and determine that the output of the information is not subject to processing, in a case the output is output during a time period outside the working time registered in the working time information.

4. The information processing system of claim 2, wherein the circuitry is further configured to determine that the output of the information is not subject to processing in a case the output of the information is the output of the business data based on the acquisition history information, and a certain amount of time has passed since a time when the business data is acquired from the external storage server.

5. The information processing system of claim 1, wherein the circuitry is further configured to:

determine that the output of the information that is output in the time period during which the user is in the facility is not subject to processing based on the entry and exit history information;

determine that the output of the information is subject to processing in a case the output of the information is not determined to be subject to processing based on the entry and exit history information, and the output of the information is the output of the business data based on the acquisition history information;

determine that the output of the information is not subject to processing in a case the output of the information is not determined to be output by the device outside the facility based on the acquisition history information and the output of the information is output during the working time registered in the working time information; and determine that the output of the information is not subject to processing in a case the output of the information is output during a time period outside the working time registered in the working time information.

6. The information processing system of claim 1, wherein the circuitry is further configured to:

provide the communication terminal with data of a screen for displaying the determination result indicating whether the output of the information is subject to processing, associated with the information relating to the output by the device; and receive modification of the determination result indicating whether the output of the information by the device is subject to processing.

7. The information processing system of claim 1, wherein the determination result indicates whether the output of the information by the device is subject to expense settlement.

8. An information processing method comprising:

receiving from a communication terminal that requests a device to output, information related to the output by the device;

storing in one or more memories, a determination result indicating whether the output of the information by the device is subject to processing in association with the information related to the output by the device;

acquiring entry and exit history information indicating a time period during which a user is in a facility; and determining that the output of the information having been output during the time period indicated by the entry and exit history information is not subject to processing.

9. A non-transitory recording medium storing a plurality of instructions which, when executed by one or more processors, causes the processors to perform an information processing method, comprising:

receiving from a communication terminal that request a device to output, information related to the output by the device;

storing in one or more memories, a determination result indicating whether the output of the information by the device is subject to processing in association with the information related to the output by the device;

acquiring entry and exit history information indicating a time period during which a user is in a facility; and determining that the output of the information having been output during the time period indicated by the entry and exit history information is not subject to processing.

* * * * *